United States Patent
Mantor et al.

(10) Patent No.: US 7,050,063 B1
(45) Date of Patent: May 23, 2006

(54) 3-D RENDERING TEXTURE CACHING SCHEME

(75) Inventors: Michael Mantor, Orlando, FL (US); John Austin Carey, Winter Springs, FL (US); Ralph Clayton Taylor, Deland, FL (US); Thomas A. Piazza, Granite Bay, CA (US); Jeffrey D. Potter, Winter Springs, FL (US); Angel E. Socarras, Lake Mary, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/502,994

(22) Filed: Feb. 11, 2000

Related U.S. Application Data (60) Provisional application No. 60/119,681, filed on Feb. 11, 1999.

(51) Int. Cl.
G09G 5/00 (2006.01)

(52) U.S. Cl. ............... 345/582; 345/552; 345/557; 345/558; 345/535; 345/564; 345/565

(58) Field of Classification Search ............ 345/582, 345/587, 531, 535, 537, 552, 557, 564, 558, 345/565
See application file for complete search history.

(56) References Cited

U.S. PATENT DOCUMENTS

| | | | |
|---|---|---|---|
| 4,727,365 A * | 2/1988 | Bunker et al. ............ | 345/427 |
| 5,179,638 A | 1/1993 | Dawson et al. | |
| 5,185,856 A | 2/1993 | Alcorn et al. | |
| 5,493,644 A * | 2/1996 | Thayer et al. ............ | 345/531 |
| 5,548,709 A * | 8/1996 | Hannah et al. ............ | 345/552 |
| 5,596,686 A * | 1/1997 | Duluk, Jr. ............ | 345/422 |
| 5,598,517 A | 1/1997 | Watkins | |

(Continued)

OTHER PUBLICATIONS

Blow, "Implementing a Texture Caching System", Game Developer, http://www.gdmag.com, Apr. 1998 "The Virtual Texture Engine", 3Dlabs Inc. Ltd., Issue 1, pp. 1-6, 1999.

(Continued)

*Primary Examiner*—Kimbinh T. Nguyen
(74) *Attorney, Agent, or Firm*—Sharon Wong (57) ABSTRACT

A 3D rendering texture caching scheme that minimizes external bandwidth requirements for texture and increases the rate at which textured pixels are available. The texture caching scheme efficiently pre-fetches data at the main memory access granularity and stores it in cache memory. The data in the main memory and texture cache memory is organized in a manner to achieve large reuse of texels with a minimum of cache memory to minimize cache misses. The texture main memory stores a two dimensional array of texels, each texel having an address and one of N identifiers. The texture cache memory has addresses partitioned into N banks, each bank containing texels transferred from the main memory that have the corresponding identifier. A cache controller determines which texels need to be transferred from the texture main memory to the texture cache memory and which texels are currently in the cache using a least most recently used algorithm. By labeling the texture map blocks (double quad words), a partitioning scheme is developed which allow the cache controller structure to be very modular and easily realized. The texture cache arbiter is used for scheduling and controlling the actual transfer of texels from the texture main memory into the texture cache memory and controlling the outputting of texels for each pixel to an interpolating filter from the cache memory.

13 Claims, 8 Drawing Sheets

Texture Cache System

U.S. PATENT DOCUMENTS 5,675,773 A     10/1997  Devic
5,790,130 A  *   8/1998  Gannett ...................... 345/430
5,809,280 A  *   9/1998  Chard et al. ................ 395/487
5,831,640 A  * 11/1998  Wang et al. ................ 345/552
6,236,405 B1 *   5/2001  Schilling et al. ............ 345/582
6,300,953 B1 * 10/2001  Rivard et al. ............... 345/430

OTHER PUBLICATIONS

Hakura, et al., "The Design and Analysis of a Cache Architecture for Texture Mapping", Computer Systems Laboratory, Stanford University, Stanford, CA 94305, pp. 1-13.

* cited by examiner

Figure 1 Computer Display System

Figure 2 Texture Cache System

Figure 3 Texel Type

Figure 4 Texture Block Identifiers

Figure 5 Memory - Cache Mapping

Figure 6 Texture Cache Memory

Figure 7 Texture Cache Controller

Figure 8 Texture Cache Arbiter

3-D RENDERING TEXTURE CACHING SCHEME

This application claims priority from U.S. Provisional Application No. 60/119,681 filed on Feb. 11, 1999.

BACKGROUND OF THE INVENTION

1. Field of the Invention

The present invention generally relates to a Computer Graphics Processor (CGP) that has 3D rendering and texturing capabilities and more particularly, to improvements in the method of rendering with application of texture data. The invention will minimize the necessary external bandwidth requirements for texture data and increase the rate at which texture data is available for use in the CGP. The invention also includes an apparatus for an implementation of the methods described herein.

2. Description of the Prior Art

A CGP is commonly used for displaying images on a display screen that can be comprised of two dimensional data and/or three dimensional graphical objects that are rendered to a two dimensional surface in memory. This rendering is typically accomplished by breaking the previously mentioned objects up into a series of polygons, typically, triangles. At each vertex attribute values such as color, lighting, fog, depth, etc. and texture coordinates are assigned. By utilizing texture mapping in addition to attribute interpolation such as color, depth, lighting, fog, etc., significant detail can be applied to each pixel of a polygon to make them appear more realistic. The texture map can combine a pattern or image with the interpolated attributes of the polygon to produce a modified color per pixel with the added detail of the texture map. For example, given the outline of a featureless cube and a texture map containing a wood-grain pattern, texture mapping can be used to map the wood-grain pattern onto the cube. Typically, a two-dimensional texture pattern is mapped or warped onto a three-dimensional surface. Perspective transformations are used to calculate the addresses within the texture map of the texels (pixels within the texture map) needed to render the individual pixels of the primitive (triangle, Line, Point) on the display screen. Once texture addresses have been calculated for each pixel to be rendered, the texture map which is stored in a main memory are accessed, or fetched into a cache on the CGP device. If the surface or triangle being rendered with texture mapping is far from the viewpoint or not perpendicular to the viewer, the projected pixel can cover many texels in the texture map and severe aliasing of the texture map data may occur. U.S. Pat. No. 4,727,365 to Bunker et al. addresses this problem by pre-computing multiple filtered copies of the texture map at successively lower resolutions or levels of detail (LOD) to create an image pyramid. These texture maps are organized in memory as a three-dimensional array of texels indexed with (U,V, LOD), where U is the horizontal coordinate and V is the vertical coordinate within any map of the pyramid and LOD selects the map within the pyramid. When a pixel is projected into the finest LOD texture map, it may cover many texels. The texture mapping techniques used will compute a term labeled LOD. This LOD term is calculated by log 2 of the ratio of some measure of projected pixel size relative to the texel size (of the finest map). This term is used to select a pre-filtered map within the LOD pyramid to minimize the time and/or hardware necessary for filtering the map. This pre-filtered map selection will be affected by the relative distances from the viewpoint to the object and the angle between the object (triangle) normal and a boresight vector from the viewpoint to the object (triangle). These relationships affect the relative size of the pixel projection footprint into the texture map. The LOD selection process will produce an integer part (used to select maps) and fractional part (used to blend maps). High quality texture mapping is obtained by performing a weighted average interpolation such as bilinear interpolation in the map representing the integer LOD immediately above or below the computed LOD for each pixel. In trilinear interpolation, a linear interpolation using the fractional distance between LOD's to perform a blend between the bilinear interpolation results from both integer LODs above and below the computed LOD to obtain the texture value for the pixel.

The problem with texture mapping systems that accomplish the texture addressing and look-up in a brute force method, is that the transfer of data between the various processes require wide memory buses, multiple and/or multi-ported memory subsystems, and/or multiple clock cycles to transfer the required data. Some of these systems also are penalized with the time required to load the texture maps or large chunks of the maps into a specialized memory system prior to rendering of primitives that use it. Texture mapping has been accomplished with special purpose memory devices or a special purpose memory system that can offer effective random access anywhere within a texture map.

The nature of texture mapping allows the texture map coordinates to change in any direction, at any rate of change while processing a triangle. This continual change of address at any rate of change indicates that normally it would be hard to cache texture memory with any efficiency without a cache large enough to hold the entire texture map with random access.

In a line based rasterization system, pixels will be rendered along the horizontal line of a triangle, while the required texels from the texture map will follow some diagonal line defined by the mapping of the texture on the polygon and the position of the polygon in the screen. It is this property that makes conventional caching schemes very inefficient in line based systems, since there is very little data coherency for a column or row based system.

One such inefficient prior art system is disclosed in U.S. Pat. No. 5,548,709. In this system, a static random access memory cache is divided into two groups of parallel LOD memories. Each of the two groups has four independent quads of memory. The four quads have independent addressing so that each quad can walk in the scan direction pre-fetching data that would be needed along the scan path. While the data for recent texture maps are cached in order to accelerate the reading of texels, the rate that texture memory is accessed is still significantly too slow for the speed required for today's three-dimensional CGP.

SUMMARY OF THE INVENTION

The present invention is a unique texture caching scheme for a three-dimensional rendering system that capitalizes on a span or area based polygon rasterization strategy with texture data spatially stored in memory to create a scenario where successive pixels will use and reuse neighboring texels significantly. In addition, when prefiltered texture mapping is used, as described in U.S. Pat. No. 4,727,365 to Bunker et al., the texel to pixel ratio will be limited for any interpolation filtering (bilinear, trilinear, etc.) This will cause overlapping samples to be reused more, and thus, it will increase the effectiveness of local texel reuse when employing the texture caching scheme of the present invention.

When processing successive pixels that are spatially related, the pixels will map to the same or neighboring texels, enabling the inventive texture caching scheme to store the least recently used cache lines to eliminate a significant number of external memory read data operations.

This new caching scheme will texture map at a minimum, one pixel per clock at peak rates and can make use of inexpensive external main memory devices. The mechanism efficiently pre-fetches data at the memory access granularity from main memory and stores it in cache memory. The organization of the cache is such that it achieves a very large reuse of texels with a minimum of cache memory. The novel caching technique of the present invention achieves good caching coherency, minimizes cache misses and utilizes inexpensive memory to achieve high speed polygon texturing.

The present invention contains the following features to obtain a significant reduction of the data fetch operations that are necessary.

a) Texture data is organized in memory to group spatially related texels in the same unit of fetch and/or memory page to maximize reuse of data and minimize necessary internal storage, minimize the required fetching of data and memory page change accesses penalties. A more detailed description of this spatial tiling memory organization as set forth in provisional patent application entitled "A Linear Surface Memory for Spatial Tiling Algorithm/Mechanism", Ser. No. 60/080,270 filed on Apr. 1, 1998, the entirety of which is incorporated herein by reference.

b) Texture data in memory is labeled and viewed in a manner to illustrate mutual address exclusivity in order to:
1. Steer each texture request (based on address bits) to a set of segmented Least Recently Used (LRU) controllers responsible for allocation within a given set of cache lines.
2. Separate the cache allocation process into multiple small, fast, and easy to build LRU controllers that compare and allocate per clock.
3. Steer texture data based on address bits to exclusive banks of cache to allow multiple neighboring texel lookup per clock from single ported memories.

c) Area based rasterization order of screen pixels to order neighboring pixels to be processed on consecutive clocks while neighboring texels are still present in a small cache to maximize reuse of data.

d) Minimization of the texture data fetch granularity to the memory bus width to minimize speculative pre-fetch penalties and maximize the use of limited local storage for use and reuse of data stored.

e) Utilize a least recently used replacement algorithm and controller that can maximize local reuse of data because of spatial walking order before replacement.

f) A small local texture cache that is organized in a manner to improve the accessibility of texture data for reading/writing and maximizing local reuse of data before replacement.

g) Storage of texture data in multi-purpose general memory system that only requires data to be fetched when necessary for texturing. This requires that the data can come from a large variety of texture maps stored in the main memory without any map pre-load penalties.

The preferred embodiment of the present invention can be realized when all of these ideas are coupled together and optimized. Such a system will significantly minimize the necessary external bandwidth requirements and increase the rate at which texture data is available for use in the texture mapping process.

The present invention, by controlling and exploiting the relationships of texture data in main memory significantly increases the efficiency of a cache system. The simplicity of the cache and controlling hardware necessary for its operation, and the provision for fast read access for multiple texels of data from the cache memory into an interpolating filter make it realizable in silicon for texture mapping. The present invention utilizes nine levels of (U, V, LOD) address exclusivity in this scheme to segment and simplify the cache and controlling hardware.

In accordance with the memory organization scheme of the present invention, when the texture data is loaded into memory it is tiled so that both vertical and horizontal texels are present in each fetch unit from the main memory. Then the data in the two-dimensional array within a fetch unit can be partitioned such that each texel is given one of a number, N, of identifiers. The identifier of each texel can be determined by the least significant bit of texel addresses U and V. The texture cache memory is partitioned such that it is organized into N banks, where each bank contains texels transferred from the main memory that have the corresponding identifier. In the preferred embodiment using bilinear interpolation, the texture main memory includes four identifiers and the texture cache memory is partitioned into four banks. A unique organization technique is provided so that for each pixel projected into a texture map, the four surrounding texels will be one each of the four identifiers. This will allow a one-clock access to get the required set of four texels needed to perform bilinear interpolation from the four-banked cache.

A labeling scheme on a larger scale using one fetch unit of multiple texels as a block each having a separate identifier is also described. In the bilinear interpolation case, the preferred embodiment will include four separate texel block identifiers, where each block consists of one each of the block identifier. The texture cache memory is partitioned into a plurality of rows corresponding to a block texel identifier. Each cache memory bank has at least one row corresponding to each block identifier. In this embodiment, this partitioning of data allows the cache controller to be broken into four smaller controllers. In this case, the least significant bits of U and V texture block addresses at the fetch granularity are used to determine the type of texel blocks needed. Once the particular texel block is determined, the respective cache controller determines if the block is in cache or is needed to be fetched from main memory.

The present invention provides a unique method of viewing texture data in memory that is optimized for bilinear interpolation filtering texture. The memory organization scheme is extendable to handle trilinear interpolation or multiple texture maps through a duplication of the cache hardware. The tailored hierarchical texture cache scheme greatly reduces memory accesses while holding cache misses to a minimum. The scheme allows for minimal cache storage requirements. The present invention maximizes prefetching efficiency by the texel fetch granularity being the same as memory bus width granularity.

The segmentation of hardware created by the partitioned view of texture data in memory exhibits extremely balanced behavior. The block identifiers create checkerboard pattern in memory that will be equally accessed for polygons larger than one fetch block. By rasterizing in an area-based method, each pixel will project to texels of one fetch block type and then successive pixels will map to texels of the next block type prior to going back to the first type. With horizontal and vertical span rasterization movement, the four block groups balance nicely. If the polygon is smaller than the fetch quantity, then the texture for the whole polygon will fit into one cache entry and will only be fetched once for the given polygon.

The present invention includes multiple cache controllers that implement a one clock least recently used algorithm for the efficient scheduling of texels to be mapped onto the current pixel and issuing a fetch command for the required data from the main memory.

The cache memory control system of the present invention also includes a cache read/write arbiter that efficiently transfers the data coming from main memory into the texture cache. It also uses a look ahead mechanism to schedule the data out of the cache memory to the interpolating filter relative to the data being loaded into the cache in order to create a system that can sustain the peak output of one value per clock.

The present invention also includes a multi-ported cache for internal storage of texture data to be reused and provides fast multiple-texel access per clock.

DETAILED DESCRIPTION OF THE PREFERRED EMBODIMENTS

Figure 1:
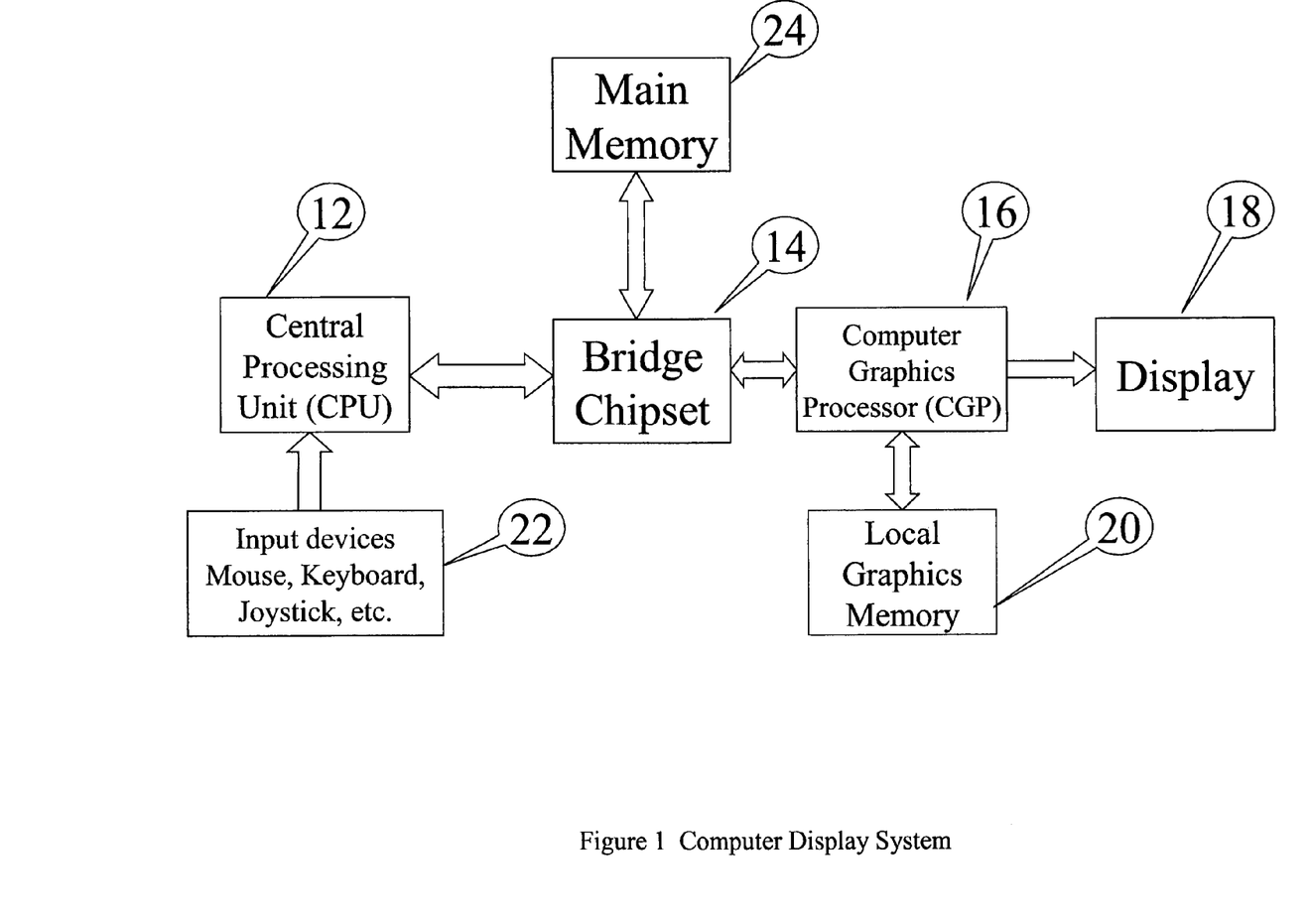
FIG. 1 is a block diagram of the basic components of a Computer Graphics System containing a Computer Graphic Processor (CGP).

FIG. 1 illustrates a functional block diagram of a computer display system. This system generally includes a Central Processing Unit (CPU) 12, a bridge chipset 14, a main memory 24, input devices 22, a display 18, a local graphics memory 20, and a Computer Graphic Processor (CGP) 16. The CGP 16 determines the graphical information to be sent to the display 18 based on inputs from the CPU (12) and data in main memory (24) and local graphics memory (20). The CPU (12) has access to data stored on disk, networks, or CD-ROM, etc. and based on power on sequences, programs booted at start up, and user inputs by the input devices, the CPU (12) will determine the data stream sent to the CGP (16). This data stream will be used by the CGP (16) to create the desired image on the display (18). The viewer is linked to the computer image generation process through an input control device (22) such as a keyboard, mouse, joystick, etc.

The CGP (16) described in this invention is large and contains many functions, which includes three-dimensional rendering of polygons with texture and thus this invention. For three-dimensional processing the CPU (12) gets database information from one of it's data inputs and loads texture maps into main memory or local graphics memory and then performs all preprocessing of database information for the CGP (16). The CGP (16) then will receive state data and triangle, line, or point (primitive) information. From this input data the CGP (16) will determine attribute data (such as diffuse red, green, blue colors, alpha, fog, depth, texture coordinates, etc) for each pixel of the primitive. The texture coordinate attributes and pixel screen location is used to read texture, previous color and depth information. All this data is then used to determine the new color and depth of each pixel to be stored in either the local graphics memory (20) or main memory (24). When all the primitives have been rendered, the CPU (12) will schedule the resulting rendered scene to be displayed on the display (18) if desired.

The hardware for performing texture mapping is contained within the CGP 16. When mip mapping or trilinear interpolation is enabled, the projected pixel size on the texel map approaches a texel size of the properly selected texture LOD. If the projected pixel increases or decreases in size appreciably, the next level of detail texture resolution map is used. This can be either a higher or lower map. The system can be designed to guarantee that the projected pixel size always remains less than one texel size. By maintaining this relationship the system will result in texels very often being reused in bilinear interpolation within each map level for the pixels within a polygon. When using a span spatial ordering approach to rendering groups of pixels within a polygon, there will be created a texture coherency resulting in multiple texel reuse.

The three-dimensional texture caching scheme of the present invention capitalizes on this reuse and locality of the texture by organizing the main memory and cache memory so that inexpensive memory devices can be used to hold the texture maps and achieve fast and efficient access. Cache size of about 256 bytes was found to be optimal for most polygon texture rendering.

Figure 2:
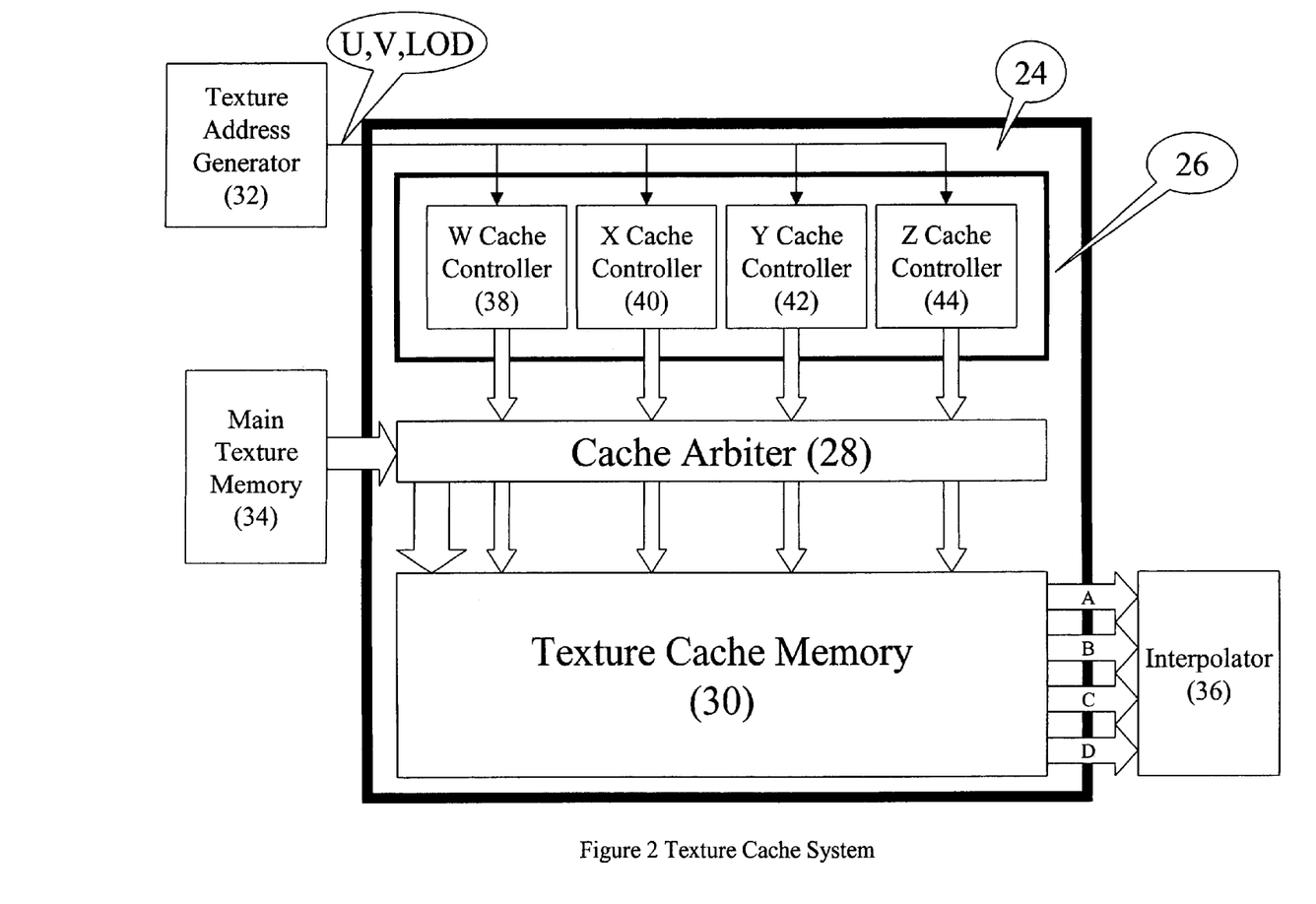
FIG. 2 is a block diagram of the texture cache device of the present invention.

Referring now to FIG. 2, there is shown a block diagram of the three-dimensional texture caching system of the present invention. The cache system 24 includes a cache controller 26, a cache arbiter 28 and a texture cache memory 30. Also shown in FIG. 2 are a texture address calculator 32, a texture main memory 34 and an interpolator 36. The texture address calculator 32 calculates the texture memory addresses (U,V) for each pixel and also the specific LODs from which the texture addresses are to be retrieved. The cache controller 26 determines if the cache memory 30 will contain the texture data for a given address or if it needs to be fetched. It allocates space for new data to be fetched and determines the location of the data required for each pixel to pass tag data to the cache arbiter 28, which will be used to schedule data entry and access from the cache memory 30. The cache controller 26 also determines the order in which data will be overwritten. Based on this determination, the cache controller 26 fetches data from the texture main memory 34 and transfers it into the appropriate addresses in the texture cache memory 30 when that cache arbiter 28 determines the data located in that location is no longer in use. In accordance with a preferred embodiment of the present invention, the cache controller 26 is comprised of four individual controllers 38, 40, 42 and 44, each of which corresponds to the partitioning of data into four different data groups in the texture main memory 34. This partitioning of data also applies to the four memory banks in the texture cache memory 30. The controllers 38,40,42,44 regulate and keep track of what is stored in the memory banks of the cache memory 30. In the preferred embodiment, each of the controllers contains four stages with each stage referencing a double quad word in the respective cache memory bank. The memory banks are organized into an array of W, X, Y and Z texel blocks, partitioned by A, B, C, and D texels in each array. The cache arbiter 28 determines if it can write the next data values into the cache without overwriting any data that is still needed. Once the appropriate texture data is determined to be present in the cache memory 30, the controller outputs the appropriate texel data into the interpolator 36 to perform the required interpolation such as bilinear interpolation.

Figure 3:
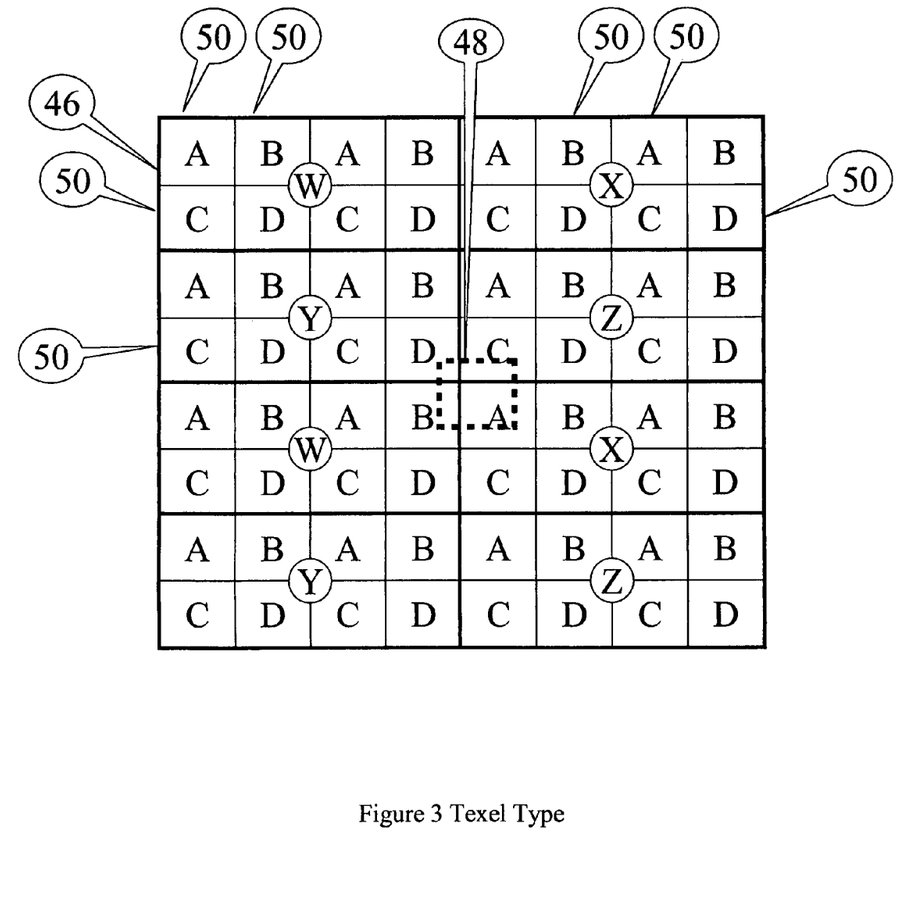
FIG. 3 is a diagram showing the labeling of texels within a texture map with four unique identifiers. It also illustrates the mapping of a pixel into the texture map.

FIG. 3 shows a texture map that is to be stored in main memory 46 being partitioned by labeling or identifying each texel with four different identifiers. As shown, texels are labeled A, B, A, B etc. across every even row of the map and likewise C, D, C, D etc. across every odd row of the map. This organization results in an interesting relationship when bilinear interpolation is performed. After mapping a pixel into the texture map, the texture addresses to the texels that surround the mapped pixel result in a group of texels, no matter what four are selected, that will always be consisting on one A, one B, one C, one D type of texel. This allows the organization of texel types in cache memory to be in banks so that all four texels that are needed for a pixel can be accessed in one clock cycle. This is accomplished by putting all A types in one bank, all B types in another bank, C types in a third bank, and D types in a fourth bank. The mapping of pixel 48 into texture map 46 is an example showing that one of each texel type will be selected for bilinear interpolation.

As can be seen in FIG. 3, a texture map in main memory 46 contains an array of texels 50 having addresses that arranged in rows and columns. Since there is a plurality of even numbered rows and columns and a plurality of odd numbered rows and columns of texels, each of the texels 50 have a per texel memory identifier A, B, C, D attached to each address in accordance with the following criteria:

The first identifier A being assigned to texels that have addresses in both even rows and even columns;

The second identifier B being assigned to texel that have addresses in both even rows and odd columns;

The third identifier C being assigned to texels that have addresses in both odd rows and even columns and;

The fourth identifier D being assigned to texels having addresses in both odd rows and odd columns.

Figure 4:
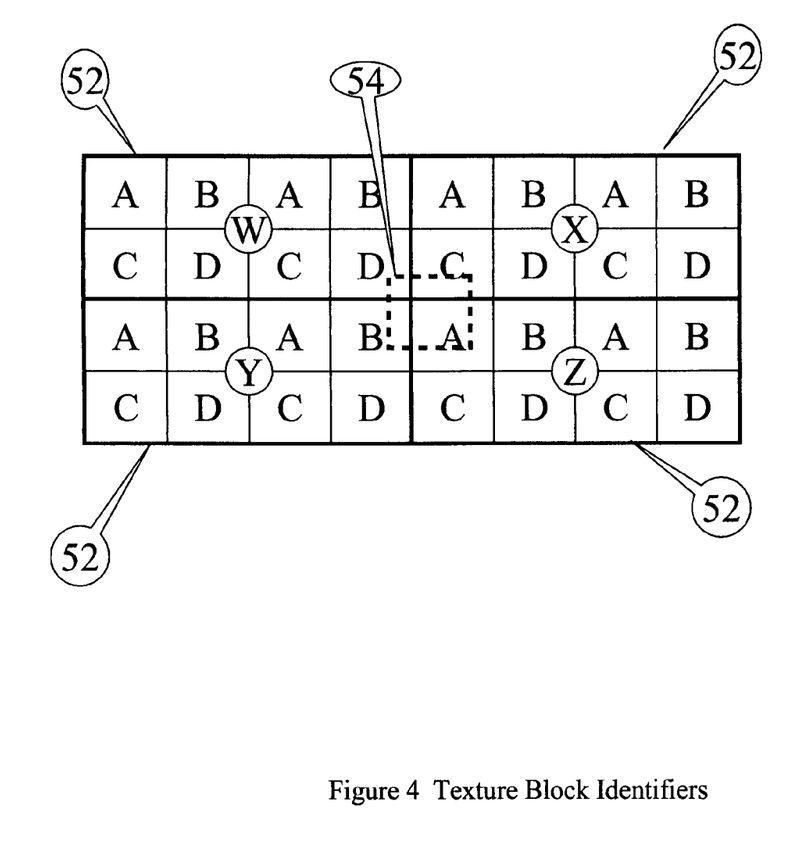
FIG. 4 is a diagram showing the organization of a texture map in main memory by texel blocks and the mapping of a pixel into the texture map.

The same organization technique can be applied on a large scale to a group or block of texels. As shown in FIG. 4, each of these texel blocks 52 are comprised of a 2×4 group of eight texels when sixteen bit texels are used. The blocks 52 are provided with four labels, W, X, Y, Z. Each of these texel blocks 52 can then be cached into separate sections of addresses within the cache memory and can be provided with separate controllers for allocation and access.

In accordance with the present invention, an optimal texture block size can be determined to simplify caching. From a topological point of view and from the random nature of the alignment of texels and pixels, the following relationship should be satisfied in order to maintain good texture coherency. First, the texel block arrangement should be compact such as a square or at most a two to one aspect ratio rectangle. Second, the texel block size should be compatible or multiples with the texture data transfer size per clock. Third, the texture main memory array should be organized so that it can be retrieved one block at a time from a single page of memory to allow the use of inexpensive memory devices. For example, if the bus width for transfer of data from main memory to cache memory is 128 bits wide per clock cycle, the number of transfers per request and the texel depth (size in bits per single texel) determines the organization. If texels are 8, 16 or 32 bits and the number of transfers per request is 1 then the optimal block sizes are 4×4, 2×4, and 2×2 respectively. The texture main memory array can be made from inexpensive memory devices because the data is organized for continuous block transfer per clock cycle.

Bilinear interpolation requires up to four texels be blended in order to render one pixel. If all the pixels in a small spatial square of the primitive are processed sequentially followed by the pixels by the next small spatial square, the four texels required for each neighboring pixel have tremendous overlap. This enables a small texture cache store and reuse the most recently used texel data for neighboring pixels over and over. This small texture cache allows the reduction of random access data needed from external memory from four texels per pixel to less than or equal one texel per pixel. Bilinear interpolation requires more than one texel to render a single pixel as shown in FIGS. 3 and 4. It is possible, therefore, that the mapping of the pixel in the texture map will cross multiple texture blocks as shown in FIG. 4. This situation is accommodated by the present invention by providing multiple numbers of texel blocks in the cache memory without an overall increase in texture block accesses. The partitioning in accordance with the present invention provides for both easy access using a minimum amount of decoding logic and retains enough memory in the cache for minimizing cache misses. Using the texel block caching scheme of the present invention with bilinear interpolation the worst case condition is shown in FIG. 4 in which the pixel 56 covers four texels A, B, C, D and four texel blocks W, X, Y and Z. Note: the condition that requires all four blocks to be fetched can only happen at the start of a primitive, in all other sequences, the neighboring pixel processed prior to this one would have required part of the data to be fetched.

Figure 5:
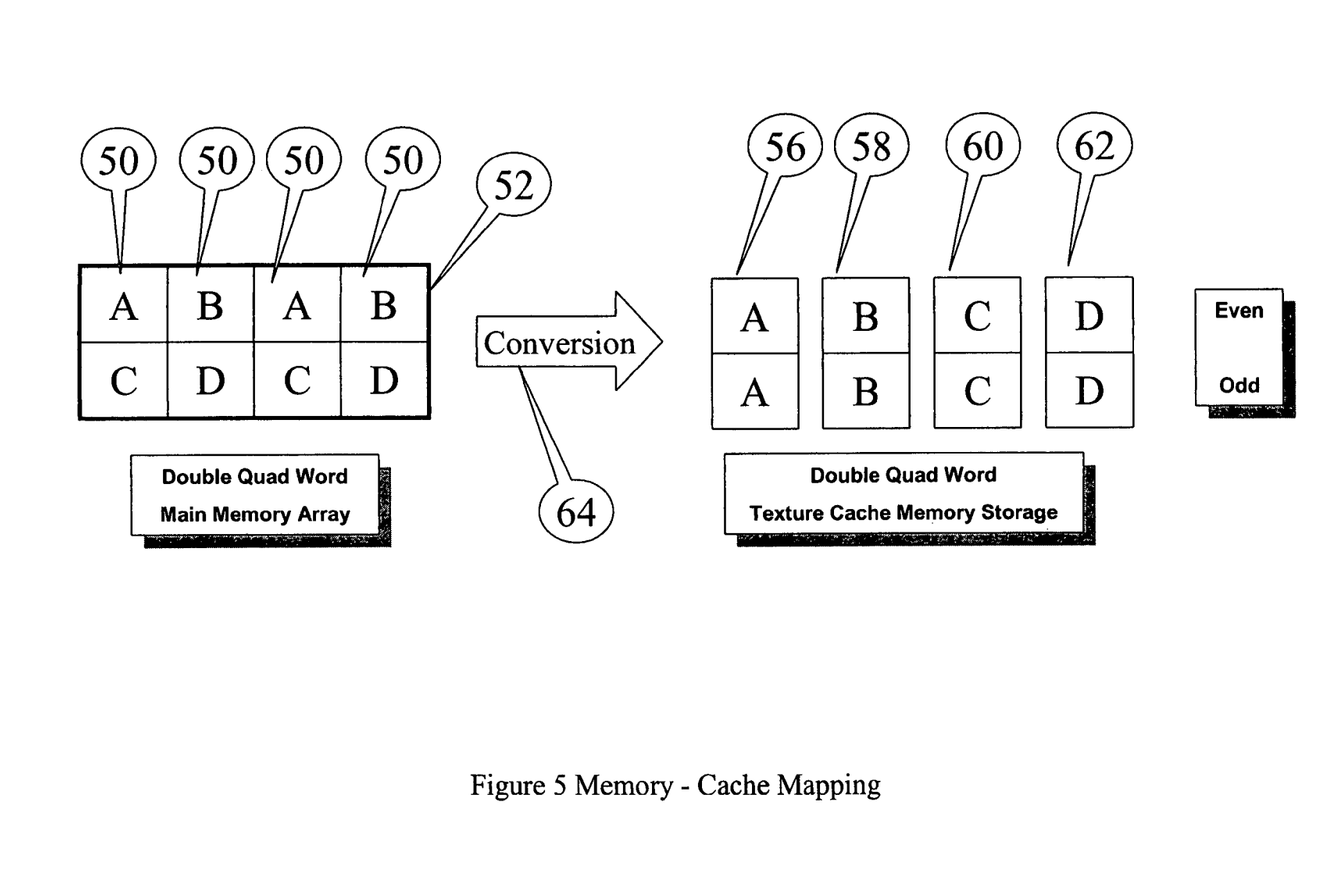
FIG. 5 is a diagram depicting the memory organization of the cache memory for texels transferred from the main memory.

As shown in FIG. 5, when texture data is moved from texture main memory to texture cache memory, the texels 50 undergo a conversion or reorganization. They are stored in the texture main memory array so that a double quad word contained in texel block 52 can be accessed and sent across the bus 64. The texture cache memory storage requires a reorganization of the elements so that they are stored in a form necessary for access per clock cycle in the bilinear texture interpolator. This is achieved by storing the texels of the double quad word in four cache memory banks 56,58, 60,62. A double quad word is made up of an even and an odd part. The A texels of double quad word 52 are stored in bank A, the B texels are stored in bank B, the C texels are stored in bank C and the D texels are stored in bank D.

Figure 6:
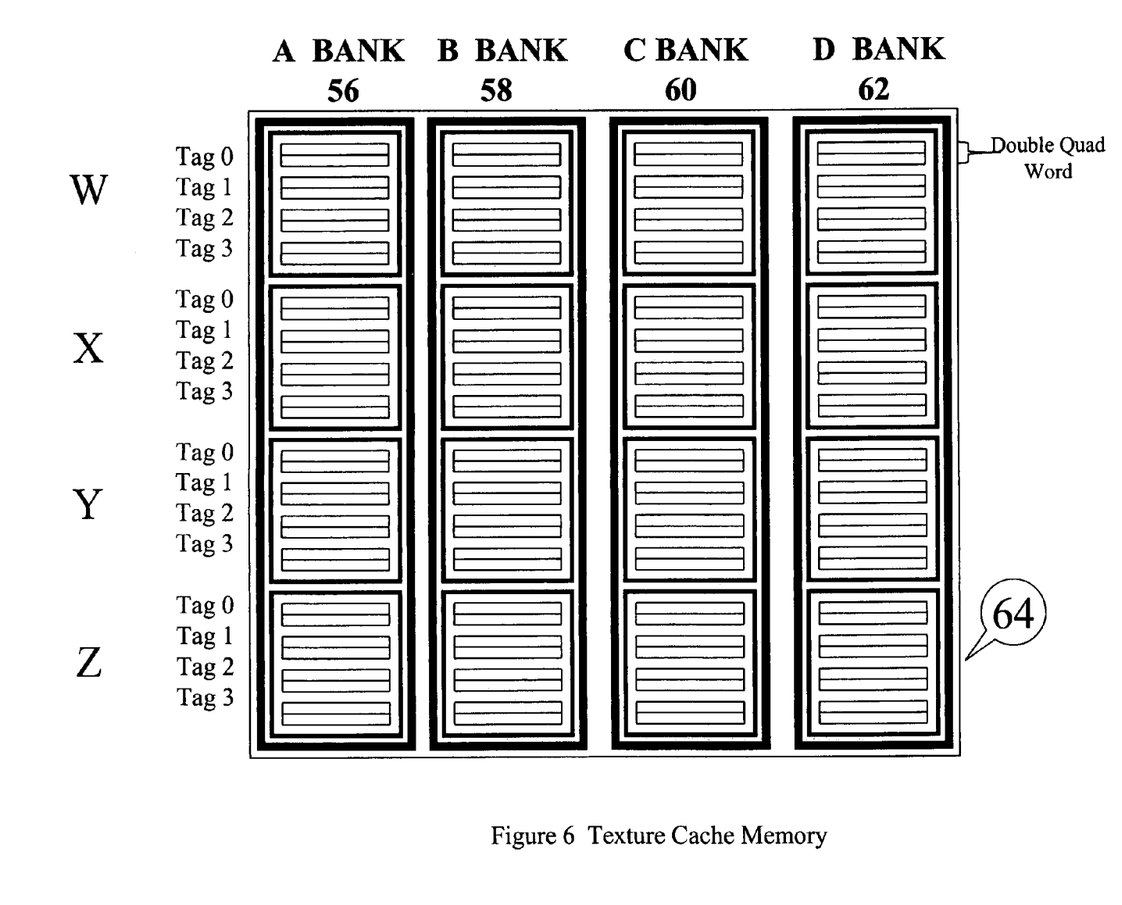
FIG. 6 is a diagram showing the hierarchical cache memory organization for a preferred embodiment having four banks of memory and four texel blocks of main memory.

As shown in FIG. 6, the double quad words that are accessed and transferred from texture main memory are loaded into one of 16 different tag locations in the texture cache memory. The cache memory storage organization is indexed by three parameters, which are:

1. W, X, Y and Z;

2. Tag 0, tag 1, tag 2, and tag 3; and

3. A, B, C, and D.

The texture cache memory 64 and cache controller work together as memory storage and address decoder, respectively. When the cache controller is presented with a U, V and LOD it responds with the proper tags where the proper A, B, C, and D texels can be retrieved from in the cache memory 64. This retrieval process can happen per clock since the data has been pre-fetched and is residing in the texture cache memory. The cache controller uses the texture addresses most significant bits to determine its location and hit, miss information, while the selection of the unique location of the A, B, C, and D types, and the partition block descriptor W, X, Y, Z is determined from the least significant bits.

FIG. 6 shows the implementation preferred for use with bilinear interpolation, in which there are four banks of memory, 56,58,60,62, one for each A, B, C, and D texels. There are four rows of data corresponding to the four cache controllers labeled W, X, Y, and Z. Each row has four sub-rows identified by tags 0, 1, 2, and 3. Each tagged sub-row has an odd and even sub-row associated with it. This brings the total number of texels stored in cache memory to 128 16-bit texels.

Each cache controller provides the mapping from U, V, and LOD to the proper tag location for access to necessary A, B, C, and D texels. This is performed by the four stages in each cache controller. When the cache is properly index by the cache arbiter 28 in FIG. 2, it returns four texels one each of A, B, C, and D.

The cache controller system is made up of four separate controllers one for each the W, X, Y and Z partition. Each one of these controllers contains four stages. With each stage referencing a double quad word in the cache memory bank. The banks are organized into an array of W, X, Y, and Z partitioned by A, B, C, and D texels. The controllers regulate and keep track of what is stored in the cache memory banks. There is a separate cache controller for each of the W, X, Y, and Z partitions. The description of each of the four controllers is the same, so only one need be described.

Figure 7:
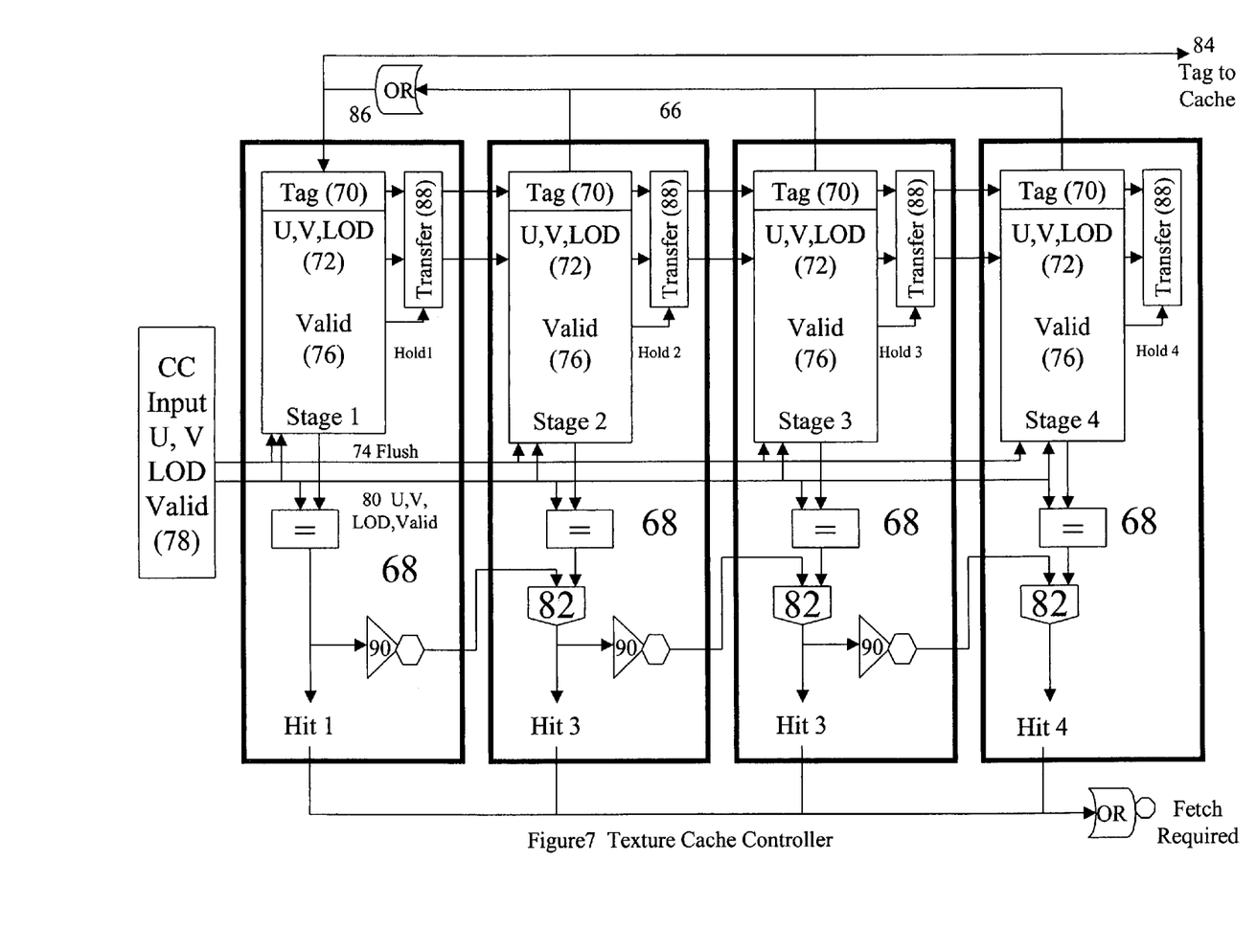
FIG. 7 is a schematic diagram of the cache controller of the present invention.

FIG. 7 shows one such controller 66. The controller 66 is made up of stages 68, numbered 1 through 4. A single stage stores the most significant bits of the U and V address necessary to determine a single quad word. Along with this information is the LOD map that is being accessed. A tag 70 for each stage is used to locate where in the cache memory that the single quad word is being stored. All tags 70, and U, V, and LOD information 72 move among the four stages 68 as new pixels are rendered with the texels stored in the cache.

The controller 66 uses a flush signal 74 when all the controllers are to be cleared. This happens during startup or when a polygon with a different texture map is rendered. All data is made invalid (valid flag 76 is set to 0). Each time a valid set of address data (U, V, and LOD) enters the cache controller (CC) input unit 78, it is checked against each one of the stages 70 starting with stage 1 and ending with stage 4. The CC 66 incorporates a least recently used algorithm. The best way to explain how this algorithm works is to work through a series of operational scenarios.

The least recently used algorithm's main objective is to keep information around as long as possible so that it may be reused by future pixels. At the same time new storage must be freed up to allow for new pixel rendering texel requirements. The left most stage 68, stage 1, is the position in the CC 66 where the most recently used texel is located. The right most stage 68, stage 4, is where the least most recently used texel is located.

What follows is a series of scenarios to show the operation of the CC 66.

1. Initialize the CC 66. Here, the flush line 74 is set and each stage 1 through 4 clears its contents. The stages 68 are loaded with their default tags 70: stage 1—0(00), stage 2—1(01), stage 3—2(10), and stage 4—3(11).
2. Load information into CC 66. The first set of parameters; U, V, and LOD enters the CC input 78 and they are sent down the line 80 to each stage 68. All stages are checked and contain invalid flags so no hits will be reported. Stage 1 is loaded with the parameters and the tag does not move. Next the tag from stage 1 leaves the CC 66 on line 84 and sent to the cache arbiter and fetch logic. Since no hit flags were set, a request is issued by the fetch logic for the corresponding double quad word from texture main memory to be put into the tag location in the cache memory.
3. Load another piece of Information into CC 66. In this process the CC 66 has information in stage 1 and the rest of the stages are marked invalid. The parameters come out from the CC input 78 and are checked against the first stage, stage 1. If this matches the tag stays put, the hit flag is set which prevents data from being retrieved from the texture main memory array. If the parameters do not match then the information has to be shuffled. Stage 1 responds by Hit 1 being equally false (i.e. there is no match in Stage 1) and, therefore, move to the next stage. Stage 2 is checked next. The checking of Stage 2 has three possible outcomes. They are a) the invalid flag is on, b) the parameters match, c) the parameters do not match. If case a) is true, the information from stage 1 is moved to stage 2 including the tag. Next the parameters from CC input 78 are loaded into stage 1 and the tag in stage 2 is moved into stage 1. The double quad word is retrieved from the texture main memory array because no hit flags are set and put into the cache memory at stage 1's tag location. This retrieval happens after the parameters are shuffled. If case b) is true, the same thing happens as in case a) but this time no double quad word is retrieved from the texture main memory array, since a hit occurred and the double quad word is already at the tag location. If case c) is true the next stage, stage 3 is checked to see if one of the same conditions a), b) or c) are true. The same action happens as that for stage 2 with the exception that when the data is moved, all information including the tags are moved from stage 1 to stage 2, from stage 2 to stage 3. But only the tag from stage 3 is moved to stage 1 and rest of the parameters are loaded from the CC input 78. This process always puts the most recently requested data at the front of the chain and the least most recently used data at the end.
4. CC 66 is full with valid data at each stage, and new information is loaded in CC 66. This case is similar to the above cases where the data is shuffled and if no hit is found then a new double quad word is retrieved and the least most recently used data (oldest data) in stage 4 is scheduled to be overwritten in the cache. The action is first check stage 1, next 2, next 3 and last stage 4. Since the information was not found and all valid flags are set, data in stage 4 must be cleared or overwritten. First all the stages move their data one stage to the right and the tag in stage 4 is moved to stage 1 where it is joined with the new parameters in CC input 78. This action has replaced the oldest tag with new data and moved it to the front to become the newest or most recently used data. A request is sent out to the texture main memory array to retrieve the corresponding new double quad word and it is put into the stage 1 tag's location. Previously this tag location was stored in stage 4.

These scenarios show the operation of the least most recently used cache algorithm. The CC 66 contains a tag and parameter data (U, V, and LOD). This data is used to write and read the texel information in the cache memory.

Gate 86 is needed to feed back the tag stored in the stage where U, V & LOD are found to match or the least recently used stage, i.e. the last stage. Element 88 provides for the right shift of all data, U, V, & LOD and tags from Stage 1 to 2, Stage 2 to 3 and Stage 3 to 4 where necessary. Element 90 is a not gate that inverts the hit signal. Hold 1, 2, 3, 4 are the transfer controls. Hit 1, 2, 3, 4 indicates if U, V, & LOD were found in the associated stages.

Figure 8:
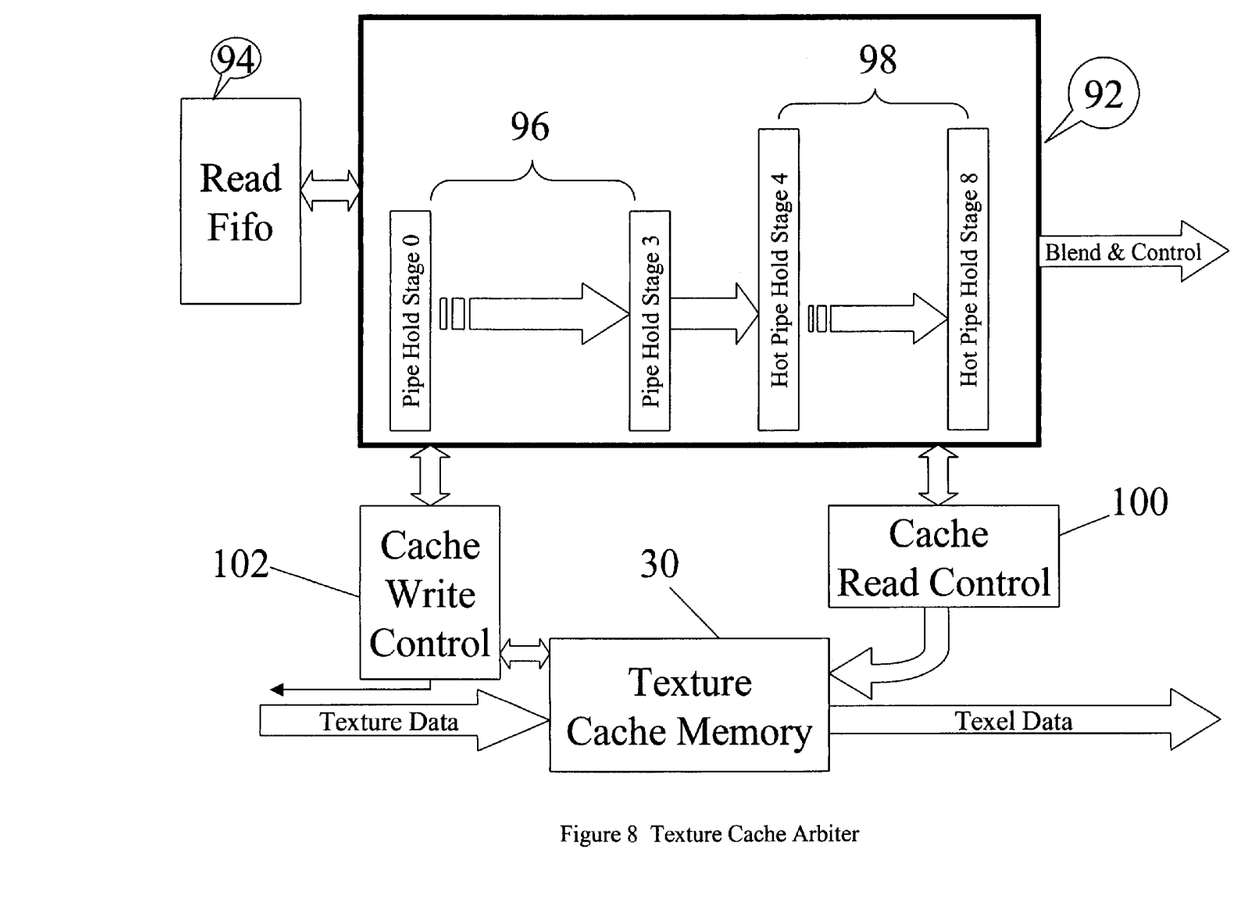
FIG. 8 is a block diagram of the cache read/write arbiter of the present invention.

FIG. 8 is a block diagram of the cache arbiter 92. The cache arbiter 92 controls the loading through write control 102 and accessing through read control 100 of the cache memory 30 based on the pixel texturing requirements. These pixels reside in the pipeline. The read FIFO 94 provides a stream of pixels that are needed to be texture mapped. Stored in FIFO 94 is enough information to tell what texels are needed for each pixel and which controllers sections W, X, Y, and Z of the cache need to be loaded prior to the processing of the current pixel.

The read fifo 94 has enough depth to hide the latency of the texture access from main memory. Enough stages of pipelining within the cache arbiter 92 are provided so that texture data per pixel can be loaded sequentially ahead of when the pixel actually reads texture data from the cache. As the data for a given pixel enters the arbiter 92, all fetch or read data requests to move data into the cache are completed unless there is a conflict with cache locations for pixels with pending read request that are still in the pipeline. In the event of a conflict, the loading of the data is stalled until the pixels in front of the current load are sent to the interpolator process and the conflict over the cache location has been removed. Also, if the data necessary for the pixel to be sent to texture interpolation process has not been loaded into the cache when the pixel has reached the last pipe stage, it will be held there until all the data needed has been loaded into the cache.

There are two kinds of hold pipes in the arbiter 92. The first type is the normal hold pipe stages 96. They are initially entered as texel read request are made. The initial stages can be simplified because a conflict is not possible for at least n clocks, where n is the number of stages with in the cache controller. A cache controller would have to miss (n+1) consecutive compares before it can reallocate a given cache location. Next, the data enters the hot pipe stages 98. In the hot pipe stages 98, it is determined if a cache slot tag is available in the proper cache (W, X, Y and Z) for the arriving texels. If so, the corresponding pipe stage is updated to indicate the needed data was written to the cache, and the texel data is stored in the cache memory at the available tag location specified by the controller. If no space is available (still in use) it is the responsibility of the hot pipe stage 98 to stall the storage of the texel and a texel loading clock time is missed.

Since it can take eight clock cycles in a worst case to load all the data necessary for one pixel, a conflict may cause a missed pixel processing clock cycle. This can only happen in very special cases; e.g. starting up a new polygon, when the LOD changes on a polygon or when in a non-LOD mode.

Through an exhaustive series of simulations it has been shown that very few clock cycles are missed and the process seldom requires clock delays. Most of the time the data is already in the cache waiting to be used. This fact is due to the nature of the texture and pixel coherency.

While it is apparent that the invention herein disclosed is well defined to fulfill the objectives previously stated, it will be appreciated that numerous modifications and embodiments may be devised by those skilled in the art, and it is intended that the appended claims cover all such modifications and embodiments as fall within the true spirit and scope of the present invention.

Having thus described our invention what we claim as new and desire to secure by Letters Patent is:

1. A computer graphics processor system having the capability of mapping texture onto a three dimensional object in a scene being displayed, the system comprising:
    a texture address calculator for generating texel addresses for a list of primitives being processed;
    a texture main memory containing an array of texels, each texel having an address and one of N identifiers;
    a texture cache memory having addresses partitioned into N banks, each bank containing texels transferred from said main memory that have the corresponding identifier;
    a texture cache controller for determining and requesting the necessary transfer of texels from said texture main memory addresses to said texture cache memory addresses, said cache controller transferring texture data at the main memory access granularity; and
    a texture cache arbiter for scheduling and controlling the actual transfer of texels from said texture main memory into the texture cache memory and controlling the outputting of texels for each pixel to a interpolating filter from the cache memory, said cache arbiter coupled between said controller and said texture cache memory for determining which texels in the cache memory can be overwritten when new texels are determined to be transferred to said cache memory by said cache controller, said texture cache arbiter transfers said texels from said texture main memory into the cache memory according to a look-ahead algorithm to hide read and write access clock cycles between sequential pixels, wherein the system further includes a span based polygon rasterization scheme so neighboring pixels of a primitive will be processed sequentially.

2. The system of claim 1, wherein the system further includes a texture addressing scheme for organizing the array of texels in main memory to group spatially related texels in one memory page.

3. The system of claim 2, wherein the texture mapping capability includes storing pre-filtered texture maps at different resolutions and bilinear interpolation texture filtering.

4. The system of claim 2, wherein said texture main memory contains an array of texels having addresses arranged in rows and columns, there being a plurality of even numbered rows and columns and a plurality of odd numbered rows and columns of texels, said texels having a per texel cache memory identifier attached to each address in accordance with the following criteria: a first identifier being assigned to texels that have addresses in both even rows and even columns of said main memory; a second identifier being assigned to texels that have addresses in both even rows and odd columns of said main memory, a third identifier being assigned to texels that have addresses in both odd rows and even columns of said main memory, and a fourth identifier being assigned to texels having addresses in both odd rows and odd columns of said main memory.

5. The system of claim 4, wherein said texture cache memory is arranged in four banks of memory in accordance with the following criteria: a first bank containing texels having the first identifier; a second bank containing texels having the second identifier; a third bank containing texels having the third identifier; and a fourth bank containing texels having the fourth identifier.

6. A method of controlling the transfer of texture data between a texture main memory and a texture cache memory while maintaining the most recently used data in the texture cache memory comprising the steps of:
   (a) receiving texture addresses for a first pixel, checking if the addresses match the addresses in a first stage of a multi-stage cache controller and doing one of the following, (1) loading the addresses in the first stage if there is no valid address in the first stage (2) reloading the addresses in the first stage if a match is found or (3) moving to a second stage if no match is found;
   (b) if step (a)(1) is true transferring the corresponding texture data from main memory into cache memory with a first tag;
   (c) if step (a)(2) is true, making no transfer of texture data because data has already been transferred;
   (d) if step (a)(3) is true, checking if the addresses match the addresses in the second stage and doing one of the following (1) if there is no addresses in the second stage moving the addresses from the first stage to the second stage and loading the addresses into the first stage (2) if a match is found moving the addresses from the first stage to the second stage and loading the addresses into the first stage (3) moving to a third stage if no match is found;
   (e) if step (d)(1) is true transferring corresponding texture data from the main memory into the cache memory with a second tag;
   (f) if step (d)(2) is true making no transfer of texture data because data has already been transferred;
   (g) if step (d)(3) is true, repeating step (d) for subsequent stages and using subsequent tags where necessary, until a last stage been checked or until a match has been found;
   (h) if the last stage has been checked and no match found loading the addresses into the first stage and moving the stored addresses to the next stage in sequence and overwriting the addresses from the last stage; and
   (i) if step (h) is true transferring corresponding texture data from the main memory into cache memory with the tag of the last stage addresses;
   (j) wherein when addresses are loaded into the first stage the tag assigned will be either the tag of the last stage or the tag within the stage that was hit, and transferring texture data at a main memory access granularity, wherein the method further includes processing neighboring pixels of a primitive sequentially in accordance with a span based polygon rasterization scheme.

7. A computer graphics processor system having the capability of mapping texture onto a three dimensional object in a scene being displayed, the system comprising:
   a texture address calculator for generating texel addresses for a list of primitives being processed;
   a texture main memory containing an array of texels, each texel having an address and one of N identifiers;
   a texture cache memory having addresses partitioned into N banks, each bank containing texels transferred from said main memory that have the corresponding identifier;
   a texture cache controller for determining and requesting the necessary transfer of texels from said texture main memory addresses to said texture cache memory addresses, said cache controller including a plurality of least recently used controllers coupled in succession to thereby transfer texels according to a least recently used replacement algorithm, said texture cache controller pre-fetching necessary neighboring texels from said texture main memory for bilinear texture filtering, said cache controller transferring texture data at the main memory access granularity; and
   a texture cache arbitrator for scheduling and controlling the actual transfer of texels from said texture main memory into the texture cache memory and controlling the outputting of texels for each pixel to a interpolating filter from the cache memory, wherein the system further includes a span based polygon rasterization scheme so neighboring pixels of a primitive will be processed sequentially.

8. The system of claim 7, wherein N is equal to four and said texture main memory is organized into a plurality of texel blocks each having one of four block texel cache memory identifier in accordance with the following criteria: each texel block consisting of at least one group of four contiguous texels, the texels in each group consisting of one of each of the per texel cache memory identifiers, and wherein said texture cache memory being partitioned into a plurality of rows corresponding to said plurality of block texel cache memory identifiers, each cache memory bank having at least one row corresponding to each of the four block texel cache memory identifiers.

9. The system of claim 7, wherein said cache controller includes N stages.

10. The system of claim 8, wherein said cache controller includes four stages, each stage controlling the transfer of texels for one of the four block texel cache memory identifiers.

11. The system of claim 10, wherein the texture cache memory is a multi-ported cache memory enabling multiple texel accesses per clock.

12. The system of claim 8, wherein said texel blocks in said main memory each consist of a double quad word of data.

13. The system of claim 8, wherein each row of said cache memory consisting of four sub-rows of data, each sub-row consisting of a pair of an even sub-row and an odd sub-row, each double quad word being stored in one pair of said even and odd sub-row of said cache memory.

* * * * *